United States Patent
Stafford

(10) Patent No.: US 9,397,928 B2
(45) Date of Patent: Jul. 19, 2016

(54) DATA DISTRIBUTION SYSTEM AND APPARATUS THEREOF

(75) Inventor: Gary Stafford, Stevenage (GB)

(73) Assignee: GLOBAL INVACOM LTD, Hertfordshire (GB)

( * ) Notice: Subject to any disclaimer, the term of this patent is extended or adjusted under 35 U.S.C. 154(b) by 433 days.

(21) Appl. No.: 13/810,321

(22) PCT Filed: Jul. 14, 2011

(86) PCT No.: PCT/GB2011/051323
§ 371 (c)(1),
(2), (4) Date: Feb. 21, 2013

(87) PCT Pub. No.: WO2012/007759
PCT Pub. Date: Jan. 19, 2012

(65) Prior Publication Data
US 2013/0173816 A1   Jul. 4, 2013

(30) Foreign Application Priority Data
Jul. 16, 2010   (GB) .................................. 1011977.4

(51) Int. Cl.
| | | |
|---|---|---|
| G06F 15/16 | (2006.01) |
| H04L 12/761 | (2013.01) |
| G02B 6/293 | (2006.01) |
| H04H 20/63 | (2008.01) |
| H04H 40/90 | (2008.01) |
| H04N 7/20 | (2006.01) |
| H04N 7/22 | (2006.01) |
| H04N 21/4363 | (2011.01) |

(52) U.S. Cl.
CPC ............ *H04L 45/16* (2013.01); *G02B 6/29304* (2013.01); *H04H 20/63* (2013.01); *H04H 40/90* (2013.01); *H04N 7/20* (2013.01); *H04N 7/22* (2013.01); *H04N 21/4363* (2013.01)

(58) Field of Classification Search
USPC .......................... 709/230; 725/78; 348/E7.05
See application file for complete search history.

(56) References Cited

U.S. PATENT DOCUMENTS

| | | | |
|---|---|---|---|
| 5,963,684 A | 10/1999 | Ford et al. | |
| 6,486,907 B1 * | 11/2002 | Farber et al. | .................... 725/78 |
| 2005/0196102 A1 | 9/2005 | Yamazaki et al. | |

FOREIGN PATENT DOCUMENTS

WO   2007096617 A2   8/2007

* cited by examiner

*Primary Examiner* — Kyung H Shin
(74) *Attorney, Agent, or Firm* — GableGotwals

(57) ABSTRACT

The invention relates to a system, apparatus and method for the distribution of digital data signals, which are received at a receiving means, to be sent to a plurality of locations downstream therefrom, in an efficient manner. The received data is received in a first format such as an RF format with a plurality of different components and is then changed in format, in one embodiment to an optical format. The data path is also split to allow a plurality of data paths to be defined which allow the data to be transmitted along the plurality of data paths to each of the downstream locations.

23 Claims, 3 Drawing Sheets

DATA DISTRIBUTION SYSTEM AND APPARATUS THEREOF

CROSS-REFERENCE TO RELATED APPLICATIONS

This application is the United States National Phase of PCT Patent Application No. GB2011/051323filed on 14 Jul. 2011, which claims priority to British Patent Application No. 1011977.4 filed 16 Jul. 2010, both of which are incorporated herein by reference.

The invention to which this apparatus relates is a system and apparatus which allows data to be distributed in an efficient and effective manner to a number of locations. Particularly, although not necessarily, the system is related to the distribution of data which has been broadcast from one or more broadcast locations and to allow the data to be distributed to a number of locations at which the data can be further processed, such as to allow video and/or audio data to be generated to be viewed and listened to via a display screen and speakers respectively.

It is known to be able to distribute and supply received data to a number of different locations, with each of the locations typically required to be supplied with the same data in order for the user to have the same services and choices available to them at each of the locations at the same time. However a problem which exists is that while some of the known distribution systems have a cost for apparatus and installation which is acceptable in relatively large scale residential and commercial developments, the cost can be prohibitive for use on a smaller scale such as, for example, distribution to a number of locations in the same domestic premises. Other known systems can be used in smaller scale environments but the installation and apparatus can be extremely bulky, obtrusive and therefore unattractive to the user or to be installed.

However, there is a clear demand to be able to provide the services which can be generated from received broadcast data at a number of locations within one or more premises so that processing means, such as a broadcast data receiver, also referred to as a set top box, can be provided at each location to receive and process the data to provide the services such as television and/or radio at each of the locations.

The aim of the present invention is therefore to provide a system, and apparatus, for use as part of the system, which allows the cost effective supply of received data for use at a number of locations.

In a first aspect of the invention there is provided a system for the provision of digital data to a number of locations along a plurality of data paths, said system including receiving means for receiving digital data from at least one source, conversion means at or adjacent to each of the said locations for providing the digital data in a suitable form for subsequent use, wherein, intermediate the receiving means and the conversion means there is provided a means for changing the format of the digital data from that in which it was received at the receiving means and splitting means are provided to split the data path into a number of data paths along which said data is transmitted to supply data to the said number of locations so that the said received digital data, or at least portions thereof is provided to each of the locations.

Typically the said locations are provided in one or more buildings or premises.

Typically the same data is transmitted to each of the said locations at substantially the same time.

In one embodiment all of the data is transmitted to all of the said locations via said system or alternatively only that data which is required at each location for a user selection to be generated at a given time is transmitted through the system In one embodiment the conversion means performs a change in format of the data and/or processing of the data. In one embodiment the change in format of the data is back to the original format in which the data was provided from the receiving location.

In one embodiment, the data is received in an RF format which is initially provided in four components, and each of said components are changed from an RF format to an optical format and the data is transmitted to the conversion means in the optical format at which the data is converted back into the RF format. Once in the RF format the data can be processed in a conventional manner, such as by a set top box, to allow the generation of video and/or audio.

In one embodiment the splitting of the data path into a plurality of data paths occurs downstream of the change in format of the data from the format in which it was originally received. In one embodiment, following the change to an optical format, as many optical data paths are generated as required from each of the components, so as to generate for each of the components, data paths to allow a data path to be passed to each of the locations for each of the components. This ensures that each of the location means receives all of the required data and at the same time.

In one embodiment of the invention, each of the optical data paths to a particular location, are carried along a coaxial optical cable. Alternatively, each of the data paths is carried along a respective optical cable so that the plurality of said cables connect to the conversion means at specific locations.

In one embodiment, the data paths which are passed to a specific location include four components of received digital data and a further data path for terrestrial broadcasting data signals. Typically, the same number and type of data paths are provided to each of the said locations.

In one embodiment, the numbers of locations are specified at the time of installation of the system and the appropriate numbers of data paths are created for each of the locations from each of the data sources.

In one embodiment, at least some of the data is received via an LNB such as a quattro LNB of a conventional form, said LNB provided in conjunction with a satellite antenna so as to receive data which is broadcast via satellite communication systems.

In one embodiment, the data is initially received in an RF format and, converted at the receiving means location and then subsequently converted back into an RF format. This allows the data to be used by conventional set top box or broadcast data receivers at each of the said locations. Alternatively, the conversion means can be incorporated into the set top box so as to allow the conversion from optical into RF format or into another format to be performed within the broadcast data receiver or set top box at each of the locations.

In one embodiment, the data which is received is received from a cable broadcast system.

Typically, at the receiving means, there is provided apparatus for splitting the data signals which are provided from a particular feed, into a number of data paths, the number of data paths typically equating the number of locations to which the data is to be transmitted.

In one embodiment, the received data is converted into an optical format and passed to a splitting means which comprises an optical splitter into which the optical data is fed and split into the number of data paths.

In one embodiment, the apparatus includes a splitting means which includes the optical data feed and a diffractive member which allows the data feed to be split into a number of data paths by passing through the diffractive member and each of said data paths are connected to an optical cable.

Preferably, the diffractive member, optical data feed and connectors to the data path are provided as part of a single unit.

In one embodiment the digital data signal for at least one component from the receiving means is split into a plurality of data outputs and directly modulates a light source provided for each data output connection with an output optical fibre cable connected thereto to define a data path from each data output connection.

In an alternative embodiment the digital data signal for at least one component from the receiving means directly modulates a single light source and the output from which feeds an optical splitter to provide a plurality of data output connections to which optical fibre cables can be connected to define a plurality of data paths therefrom.

In a yet further embodiment the splitting of the optical data is integrated within the light source and light from the light source is coupled to a plurality of optical fibre cables to define a plurality of data paths therefrom.

In one embodiment the received digital data is for use, when processed, to allow any or any combination of video, audio and/or auxiliary information to be generated.

In one embodiment the user of the system at each of said locations can select a specific television or radio programme which they wish to view and/or listen to and in response to the user selection the appropriate digital data is selected from that which has been transmitted to the location and processed to allow the selected television or radio programme to be generated.

Typically at least one user at each location can make a television or radio programme selection independently of the users at the other locations which receive data via the system.

In a further aspect of the invention there is provided a method for the distribution of digital data to a number of locations along a plurality of data paths, said method including the steps of; receiving at a first location digital data from at least one source, passing at least portions of the data to a means for changing the format of each of the components of the received digital data, generating a plurality of data paths, as required, along which said data in the new format is transmitted to supply the appropriate data to the said number of locations.

In one embodiment conversion means are provided at or adjacent to each of the said number of locations to allow the format of the data to be changed once more and/or the data to be processed.

In one embodiment the plurality of data paths are generated after the change in format has been performed. Alternatively the plurality of data paths are generated first and then the format of the data on each of the data paths is changed.

In accordance with a further aspect of the invention there is provided an optical unit, said unit including an optical data feed and a diffractive member which allows the data feed to be changed to an optical format and means are provided such that a number of data output connections are created and each of said data output connections are provided to allow connection to an optical cable which define the optical data paths emitting from the said unit It should be appreciated that this unit and the provision of the diffractive member in conjunction with the optical data feed, form a further aspect of the invention and may be used independently of the distribution system disclosed herein.

Specific embodiments of the invention are now described with reference to the accompanying diagrams; wherein FIG. 1 illustrates schematically an environment in which the invention of this application can be utilised.

Figure 1:
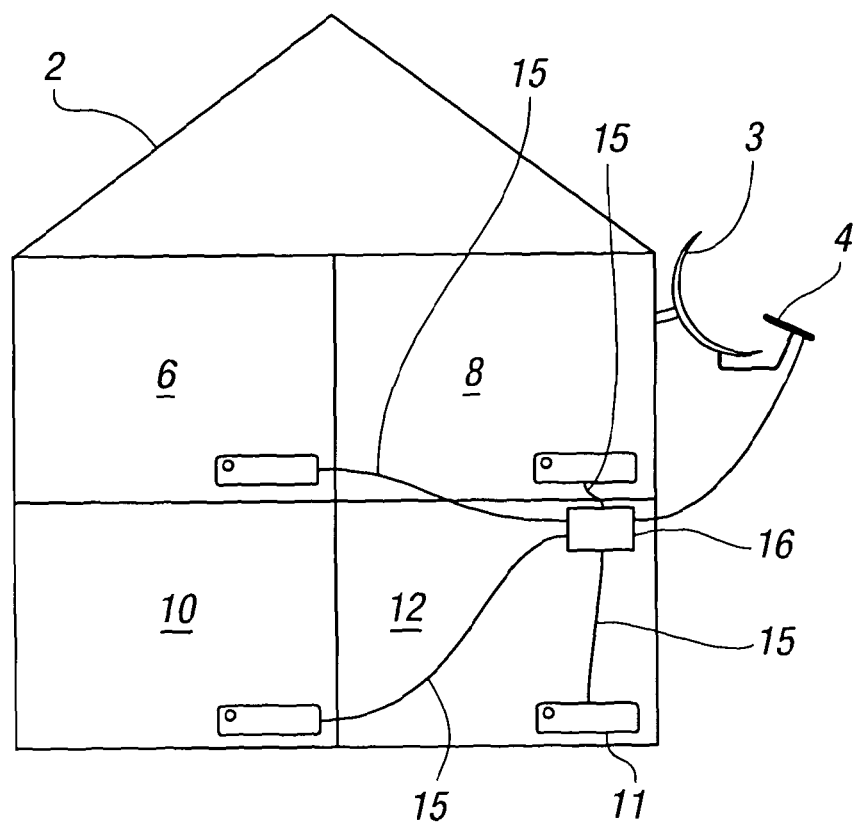

Referring to FIG. 1 there is illustrated a premises 2 which has a satellite antenna 3 and LNB 4, for receiving broadcast data which typically can be used to generate a television and radio service. The feed from the LNB is required to be available in a number of locations, four in total in this example, 6, 8, 10, 12. In accordance with the invention the data feed is supplied to each of the locations substantially simultaneously. It should be appreciated that these locations could be different apartments rather than in a single domestic premises.

Figure 2:
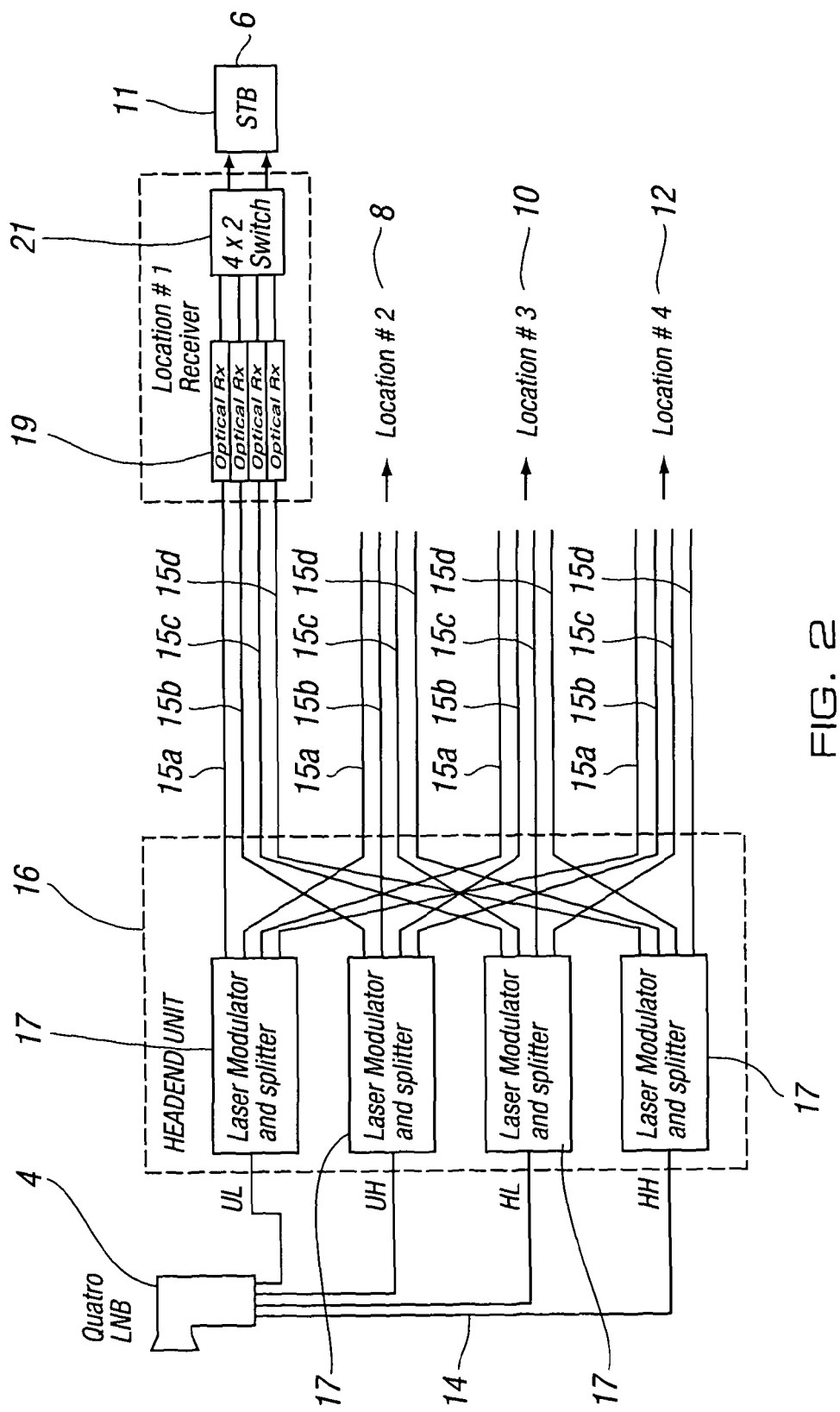
FIG. 2 illustrates one embodiment of the system and apparatus which can be utilised to perform the invention in the environment of FIG. 1.

The data feed of the received data 14 which is received in a Radio Frequency (RF) format includes four components Vertical Low (VL), Vertical High (VH), Horizontal Low (HL), and Horizontal High (HH) as shown in FIG. 2. Each of the components is passed to respective means 17 to allow the change of format to be achieved, in this case from RF to optical format by using a laser modulator, and then with the format changed splitting the data signal component into as many data paths as required (in this case into four data paths) so that each of the locations 6,8,10,12 receives the data for that component. Each of the locations 6,8,10,12 is required to be capable of receiving the data from the four components of the received data signal.

In the example shown in FIG. 2 there are provided four locations 6, 8, 10, 12 each with a broadcast data receiver or set top box (STB's) 11, in the premises 2 and each of the locations 6, 8, 10, 12 is connected to an optical format data supply 15. For clarity of illustration, each format data supply is shown as one line 15 in FIG. 1 but each will typically carry data for the four components in either a co-axial cable format or alternatively as four separate cables 15a, 15b, 15c, 15d, as shown in FIG. 2 one for each of the components. Thus, in that arrangement each group of optical cables 15 is taken to each of the four locations, resulting, in this embodiment, in a total of sixteen optical fibre cables. Thus, in accordance with this embodiment of the invention the data feed for each component of the received data is split four ways.

The provision of the data feed in the original RF format means that the data firstly has to be converted into an optical format after the LNB and this is shown as being achieved at position 16. Once converted, the optical format data signal is then split into the number of data paths which are required in order to provide the data to each of the locations.

In the embodiment shown, at each location 6, 8, 10, 12 there is provided a conversion means 19, illustrated for location 6 in FIG. 2, which includes means for converting the format of each of the components data supplies 15a, 15b, 15c, 15d, into a format which is acceptable for processing by the apparatus 11 at the location. The conversion could, for example, be to convert the data back into the original format in which it was received at the receiving means, in this case the RF format. A switch 21 is also provided to allow the appropriate data to be selected for processing at the location in response to a user selection made via the apparatus 11, such selection being, for example, to select a particular programme for viewing and/or listening and the appropriate data for that programme is selected from the data supplied to the location.

In an alternative embodiment the switches or other means for selecting specific data for each location may be provided at the head end 16 or LNB 4, in which case a signal is sent from each of the locations 6, 8, 10 12 to the appropriate switch or means to indicate the user selection made and therefore only the data which is required for the particular user selection at a particular location will be transmitted through the system, and in the same manner as herein described to the particular location. In this embodiment different data and/or amounts of data may be transmitted to the locations 6, 8, 10, 12 at any instant in time, dependent upon the user selection made at that time.

Figure 3:
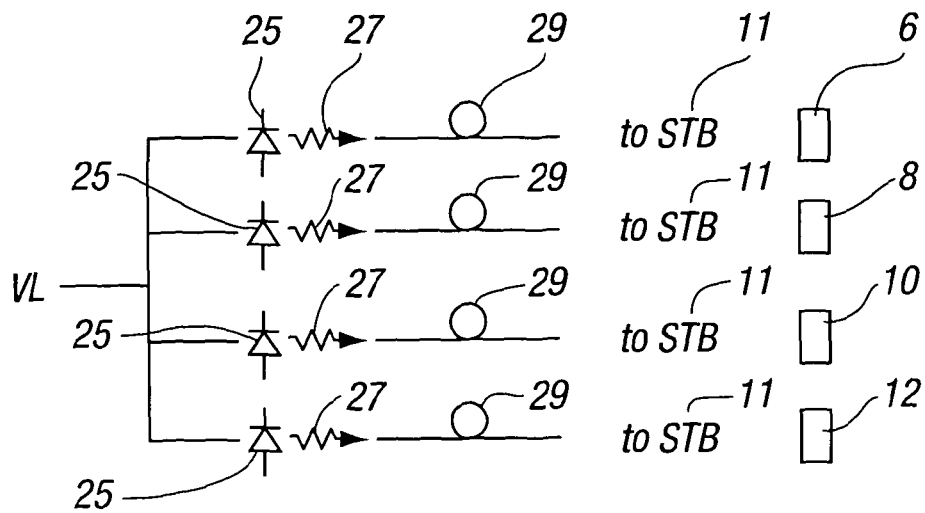
FIG. 3 illustrates a first embodiment of achieving the splitting of a data feed into a number of data paths.
Figure 4:
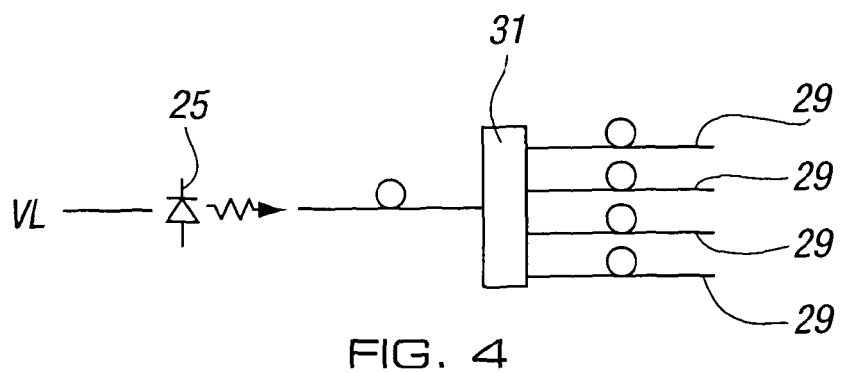
FIG. 4 illustrates a second embodiment of splitting a data feed into a number of data paths.
Figure 5:
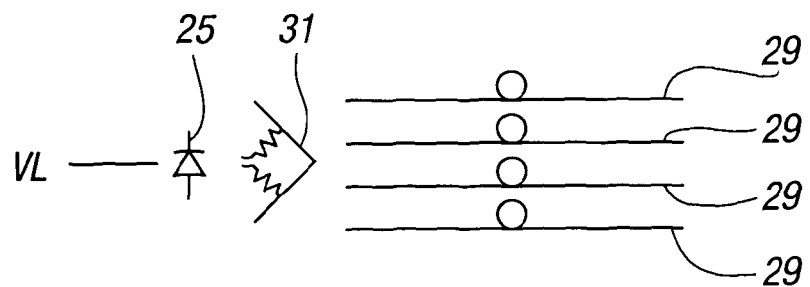
FIG. 5 illustrates a further embodiment of splitting a data feed into a number of data paths.

FIGS. 3-5 illustrate three possible ways of splitting the optical data signal in accordance with the invention and this is typically done at each of the means 17 for converting the format of the data signal components, normally at the location 16. FIG. 3 illustrates how the data signal for one band component VL, from the LNB 4 is split, in this case four ways for the four locations 6, 8, 10, 12 and these are used to directly modulate four semiconductor lasers 25, to create four data output connections 27 for connection, respectively, to the optical fibres 29 via which the data is sent to the STB 11 locations 6, 8, 10, 12 in the home. It will be appreciated that instead of semiconductor lasers, other means such as LEDs can be utilised. It should be appreciated that for this and the other embodiments shown in FIGS. 4 and 5, the process will be performed for each of the components, VL, VH, HL, HH and only one component is shown in these figures for ease of reference FIG. 4 illustrates how the RF signal component VL from the LNB 4 is taken and used to directly modulate a single semiconductor laser 25, the output from which feeds a separate optical splitter 31 which provides the signals to be passed to the optical fibres 29 to be taken to each STB.

FIG. 5 illustrates a variation of FIG. 4 where the optical splitting function 31 is integrated within the laser modulator apparatus 25. This ensures that the light from the laser chip 25 couples to several optical fibres 29, either directly or via a diffractive optical element and so the required signal can again be provided on multiple fibres.

There is therefore provided in accordance with the invention, a system and apparatus which allows distribution of data which is received at a premises to a number of receiving locations within the one or more premises in a cost effective and efficient manner, thereby rendering the system and apparatus capable of installation in a relatively small scale environment.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is limited only by the scope of the attached claims, including the full range of equivalency to which each element thereof is entitled.

The invention claimed is:

1. Apparatus for the provision of digital data to a plurality of locations (6, 8, 10, 12) along a plurality of data paths (15), said apparatus comprising:
    a receiving apparatus having a low noise block (4) and satellite antenna (3) that receives digital data from at least one source in a radio frequency format;
    an apparatus (19) to convert the digital data at or adjacent to each of the plurality of locations (6, 8, 10, 12) that provides the digital data in a suitable form for subsequent use;
    intermediate the receiving apparatus and the apparatus (19) to convert the digital data, an apparatus (16) that changes the format of the digital data from the radio frequency format in which it was received at the receiving apparatus (3, 4) into an optical format; and
    an optical format data signal splitting apparatus (25, 27, 29, 31) that splits the optical format data into a plurality of data paths along which said data is transmitted to supply data to the plurality of locations (6, 8, 10, 12) so that the said received digital data, or at least portions thereof, is provided to each of the plurality of locations (6, 8, 10, 12),
    the received digital data is for use, when processed, to generate video, audio and/or auxiliary information and a user of the apparatus at each of said plurality of locations (6, 8, 10, 12) can instruct selection of a specific television or radio program which the user wishes to view and/or listen to and a memory is provided for storage of program instructions and the appropriate digital data is selected from that which has been transmitted to the location and processed to generate the user selected television or radio program,
    wherein the radio frequency format digital data from the receiving apparatus (3, 4) is provided to the apparatus (16) as vertical low, vertical high, horizontal low, and horizontal high component paths, and at apparatus (16) the digital data on each component path is separately changed to the optical format and each of the component paths are then split by the splitting apparatus (25, 27, 29, 31) to create a data path for each component to each of the plurality of locations (6, 8, 10, 12).

2. Apparatus according to claim 1 wherein the apparatus to convert the digital data performs a change in format of the digital data and/or processing of the data.

3. Apparatus according to claim 2 wherein the change in format of the digital data is back to the original format in which the data was provided at the receiving location.

4. Apparatus according to claim 1 wherein the optical format data is changed back to the original format and the data is processed for generating video and/or audio.

5. Apparatus according to claim 1 wherein data signals are broadcast to the receiving apparatus from one or more broadcast locations via a satellite transmission system.

6. Apparatus according to claim 1 wherein the digital data is received from a cable broadcast system.

7. Apparatus according to claim 1 wherein a data path is provided for terrestrial broadcast data signals.

8. Apparatus according to claim 1 wherein each of the data paths to a particular location is provided on a coaxial optical cable.

9. Apparatus according to claim 1 wherein each of the data paths to a particular location is provided with an optical cable.

10. Apparatus according to claim 1 wherein the apparatus to convert the digital data at the location is provided within a broadcast data receiver at the location.

11. Apparatus according to claim 1 wherein the received data is converted into an optical format and the data path is then split into the required number of data paths using an optical format data signal splitting apparatus or the data path is split into a plurality of data paths and the format of the data on each of the data paths is changed.

12. Apparatus according to claim 11 wherein the optical format data signal splitting apparatus includes an optical data feed and a diffractive member which allows the data feed to be split into a number of data output connections by passing the optical data through the diffractive member and each of said data output connections are connected to an optical cable which define the optical data paths.

13. Apparatus according to claim 12 wherein the diffractive member, optical data feed and data output connections are provided as part of a single unit.

14. Apparatus according to claim 11 wherein the digital data signal for at least one component from the receiving apparatus is split into a plurality of data outputs and directly modulates a light source provided for each data output connection with an output optical fibre cable connected thereto to define a data path from each data output connection.

15. Apparatus according to claim 14 wherein the light source is a laser or a light emitting diode.

16. Apparatus according to claim 11 wherein the digital data signal for at least one component from the receiving apparatus directly modulates a single light source and the output from which feeds an optical format data signal splitting apparatus to provide a plurality of data output connections to which optical fibre cables can be connected to define a plurality of data paths therefrom.

17. Apparatus according to claim 11 wherein the splitting of the optical data is integrated within a light source and light from the light source is coupled to a plurality of optical fibre cables to define a plurality of data paths therefrom.

18. Apparatus according to claim 1 wherein at least one user at each location can make a television or radio program selection independently of the users at other locations which receive data via the system.

19. Apparatus according to claim 1 wherein the plurality of locations are provided in one or more buildings or premises.

20. Apparatus according to claim 1 wherein the same data is transmitted to each of the plurality of locations at substantially the same time.

21. A method for the distribution of digital data to a plurality of locations along a plurality of data paths, said method comprising the steps of:

receiving at a first location (2) digital data from at least one source;

passing at least portions of the digital data to an apparatus (16) for changing the format of each component of the received digital data from a radio frequency format to an optical format; and generating a plurality of data paths along which said data in the new format is transmitted to supply the appropriate data to the plurality of locations, wherein the radio frequency format digital data from the receiving apparatus (3, 4) is provided to the apparatus (16) as vertical low, vertical high, horizontal low and horizontal high component paths, the data on each component path is separately changed into the optical format, and each of the component paths is split to create a data path for each component to each of the plurality of locations (6, 8, 10, 12).

22. A method according to claim 21 wherein the apparatus (16) is provided at or adjacent to each of the plurality of locations to change the format of the data once more and/or to process the data.

23. An optical unit (16), said unit comprising:

an optical data feed and a diffractive member for changing a radio frequency format digital data feed to an optical format; and a plurality of data output connections, each of said data output connections connecting to an optical cable which defines the optical data paths emitting from the optical unit, wherein the radio frequency format digital data is provided to the optical unit as vertical low, vertical high, horizontal low and horizontal high component paths, and the optical unit changes the digital data on each component path separately to the optical format and each of the component paths is then output from the optical unit via the plurality of data output connections to create an optical data path for each component.

* * * * *